(12) United States Patent
Pawlak et al.

(10) Patent No.: US 12,491,511 B2
(45) Date of Patent: Dec. 9, 2025

(54) MICROFLUIDIC CHANNEL STRUCTURE AND METHOD

(71) Applicant: GlobalFoundries U.S. Inc., Malta, NY (US)

(72) Inventors: Bartlomiej J. Pawlak, Leuven (BE); Ramsey M. Hazbun, Colchester, VT (US); Siva P. Adusumilli, South Burlington, VT (US); Mark D. Levy, Williston, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 780 days.

(21) Appl. No.: 17/807,896

(22) Filed: Jun. 21, 2022

(65) Prior Publication Data
US 2023/0405582 A1 Dec. 21, 2023

(51) Int. Cl.
*B01L 3/00* (2006.01)
*G01N 27/414* (2006.01)

(52) U.S. Cl.
CPC ... *B01L 3/502715* (2013.01); *B01L 3/502707* (2013.01); *G01N 27/414* (2013.01); *B01L 2200/12* (2013.01)

(58) Field of Classification Search
CPC ......... B01L 3/502715; B01L 3/502707; B01L 2200/12; G01N 27/414
See application file for complete search history.

(56) References Cited

U.S. PATENT DOCUMENTS

| | | | |
|---|---|---|---|
| 11,016,055 B2 | 5/2021 | Campanella-Pineda et al. | |
| 11,198,119 B2 | 12/2021 | Delamarche et al. | |
| 2007/0257312 A1* | 11/2007 | Oh | H01L 21/7624 257/E29.295 |
| 2008/0188073 A1* | 8/2008 | Wells | H01L 21/02381 257/E21.585 |
| 2017/0253479 A1* | 9/2017 | Nikoobakht, IV | B01L 3/502707 |
| 2020/0144369 A1 | 5/2020 | Lin et al. | |
| 2021/0132002 A1* | 5/2021 | Ghyselen | H01L 21/76254 |

FOREIGN PATENT DOCUMENTS

WO WO-2013105574 A1 * 7/2013 .......... B01J 19/0093

OTHER PUBLICATIONS

WO-2013105574-A1 English translation, Microchannel Device and Method for Manufacturing Same, Kasahara (Year: 2013).*
Meint J. de Boer et al., "Micromachining of Buried Micro channels in Silicon," Journal of Microelectromechanical Systems, vol. 9, No. 1, Mar. 2000, 94-103.

(Continued)

*Primary Examiner* — Britt D Hanley
*Assistant Examiner* — Illiam C. Trice, III
(74) *Attorney, Agent, or Firm* — Francois Pagette; Hoffman Warnick LLC

(57) ABSTRACT

Disclosed is a semiconductor structure including a monocrystalline silicon layer having a first surface and a second surface opposite the first surface. A cavity extends into the first semiconductor layer at the second surface. The structure also includes a polycrystalline silicon layer adjacent to the second surface and extending over the cavity. At least one opening extends through the second semiconductor layer to the cavity.

20 Claims, 16 Drawing Sheets

(56) References Cited

OTHER PUBLICATIONS

Anonymous, "Microfluidics: A general overview of microfluidics," retrieved from: https://www.eveflow.com/microfluidic-reviews/general-microfluidics/a-general-overview-of-microfluidics/ 2022, 5 pages.

Wang et al., "Design and Fabrication of Double-Layer Crossed Si Microchannel Structure," Micromachines 2021, 12, 1557, https://doi.org/10.3390/mi12121557, published Dec. 14, 2021, 9 pages.

Anonymous, X-FAB, "Connecting the two worlds of microelectronics and microfluids," retrieved from: https://www.xfab.com/technology/silicon-based-microfluidics, 2020, 12 pages.

Q. Yu et al., "Fabrication Method of Microfluidic Channels with Circular Cross Section for Micro-Coriolis Mass Flow Sensor," The 4th Conference on MicroFluidic Handling Systems, Oct. 2-4, 2019, Enscheda, The Netherlands, pp. 103-105.

\* cited by examiner

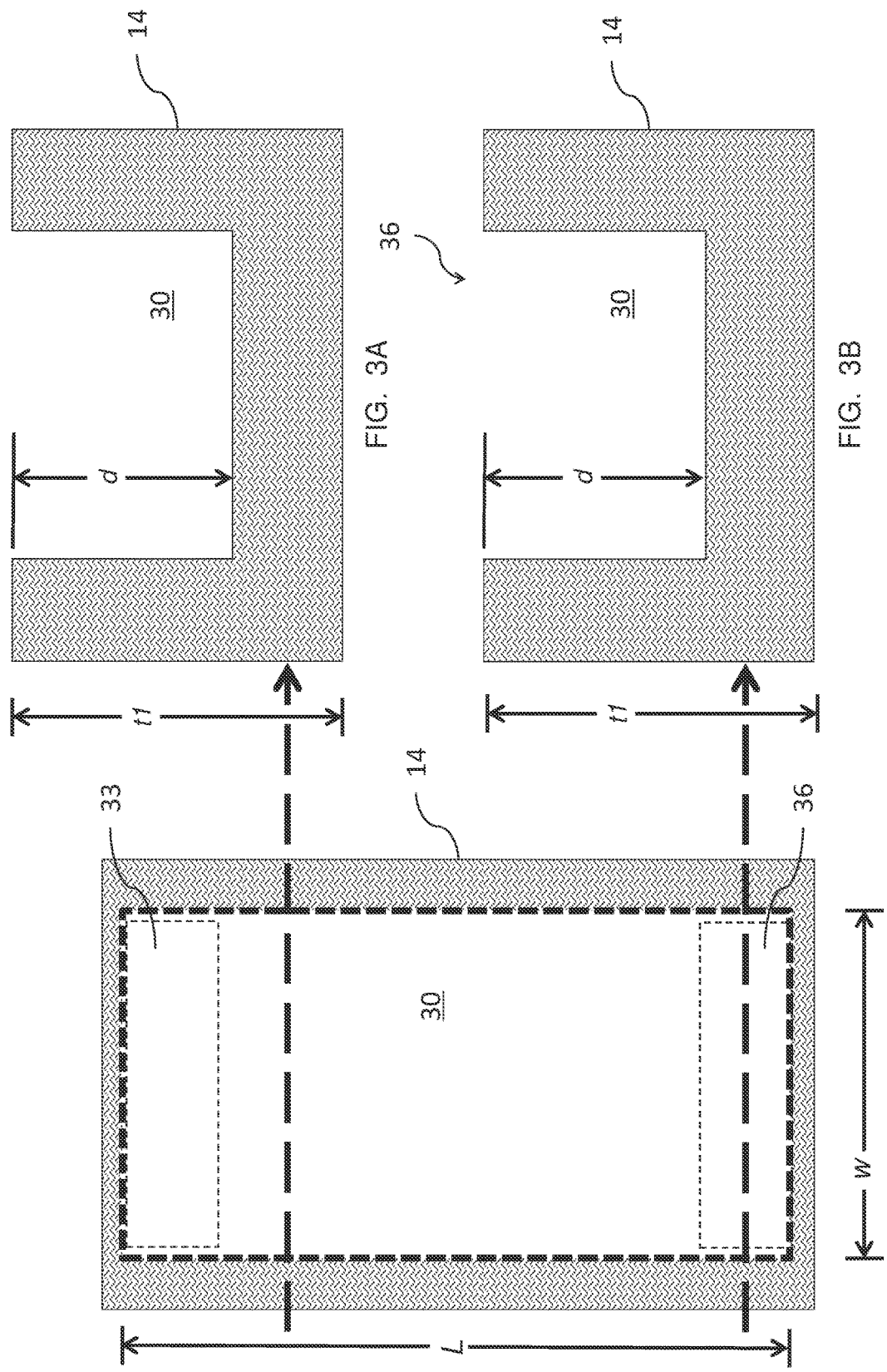

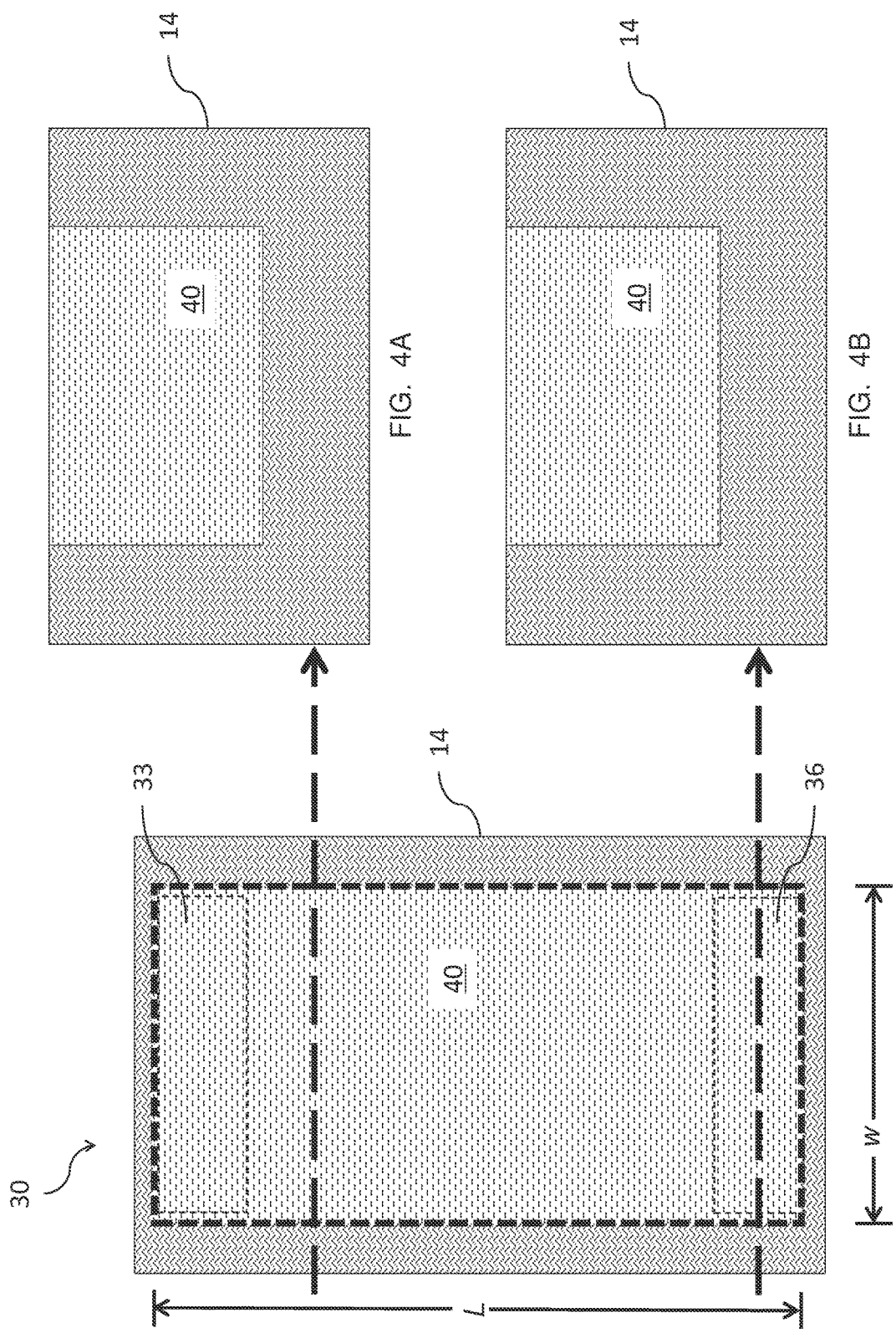

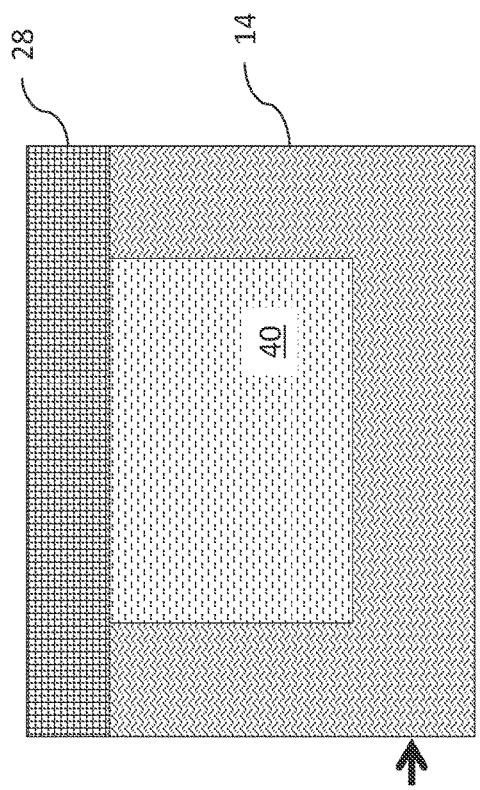
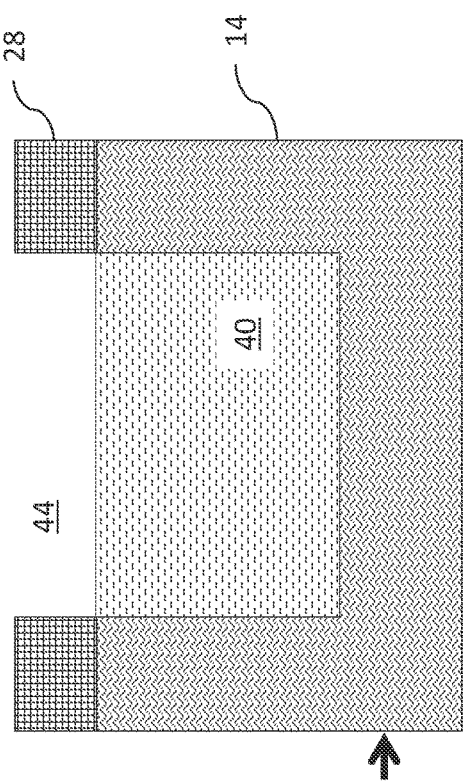
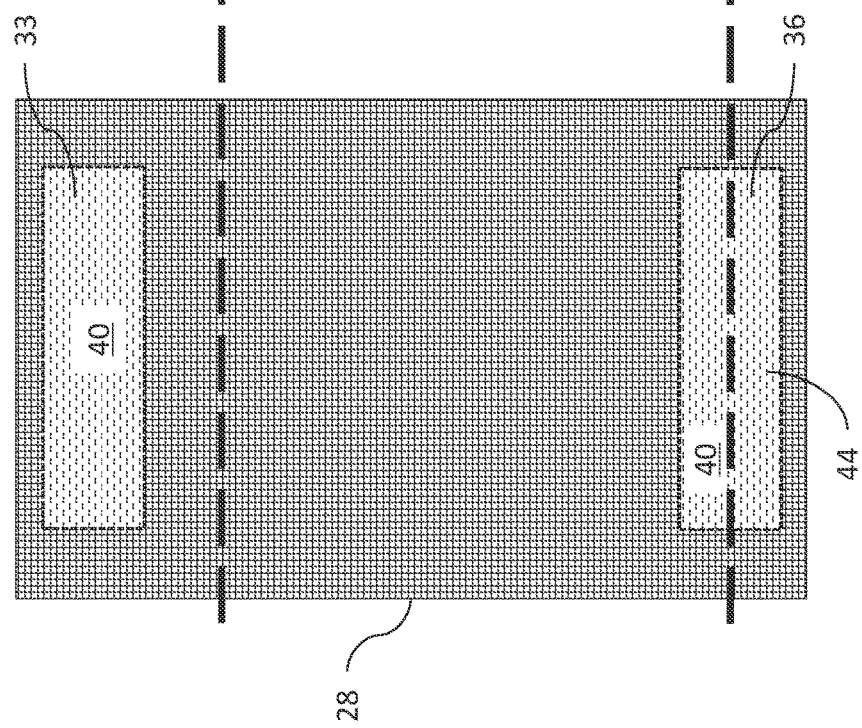

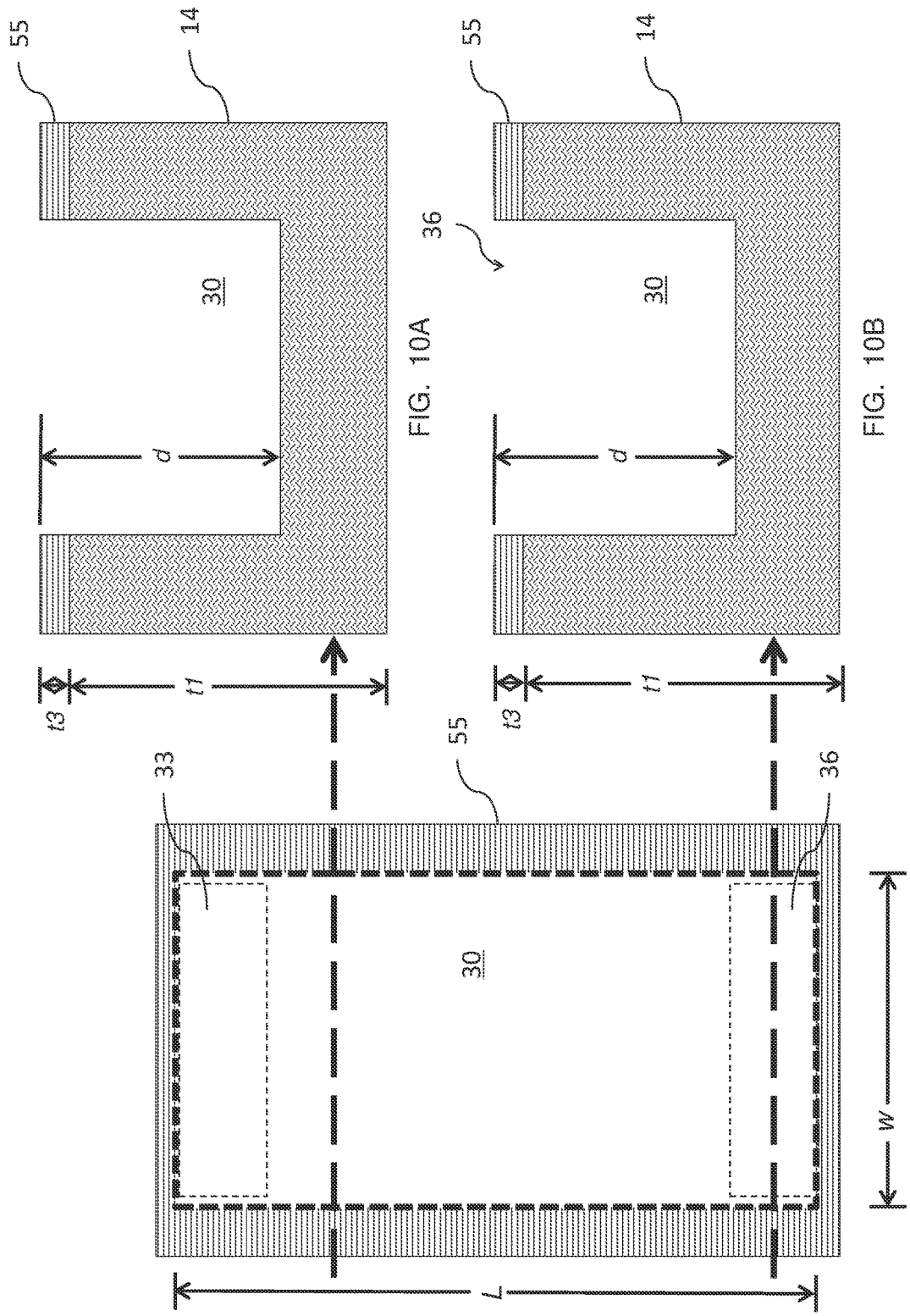

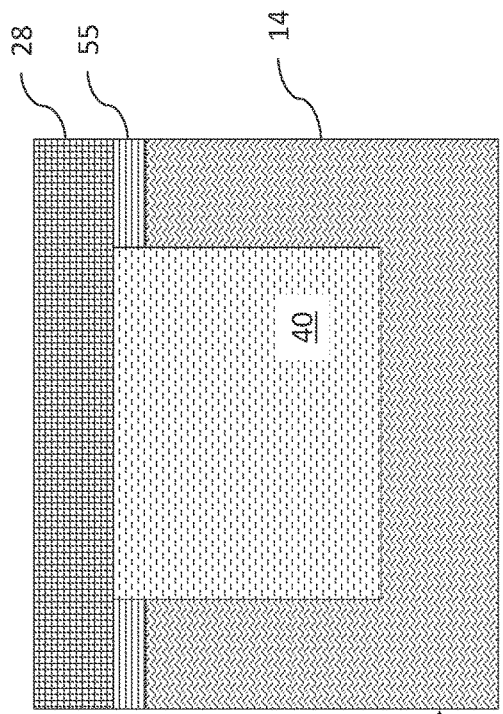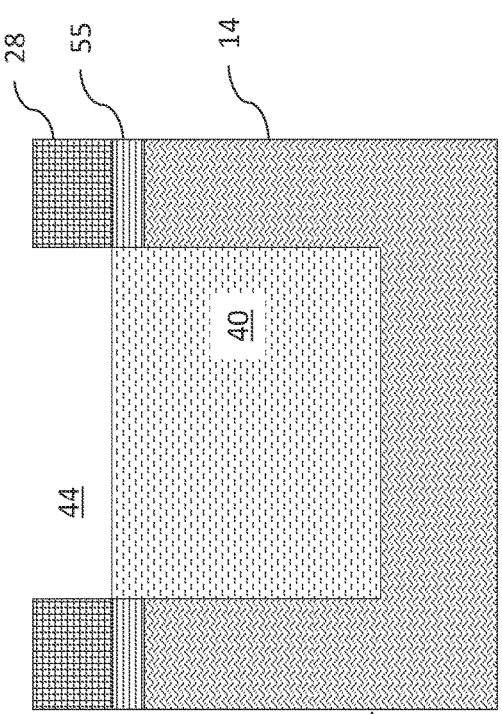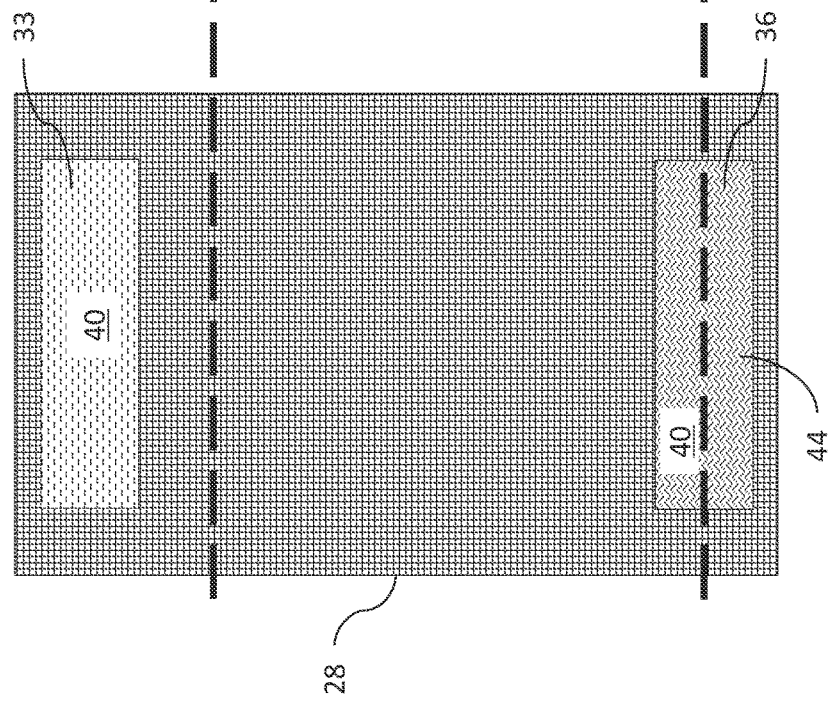

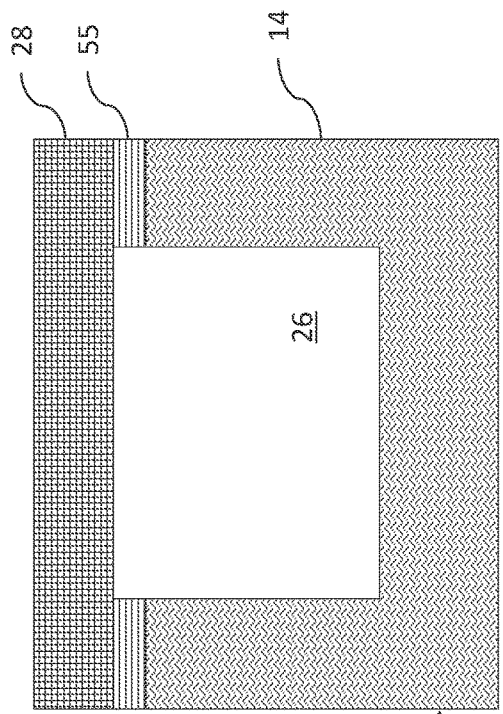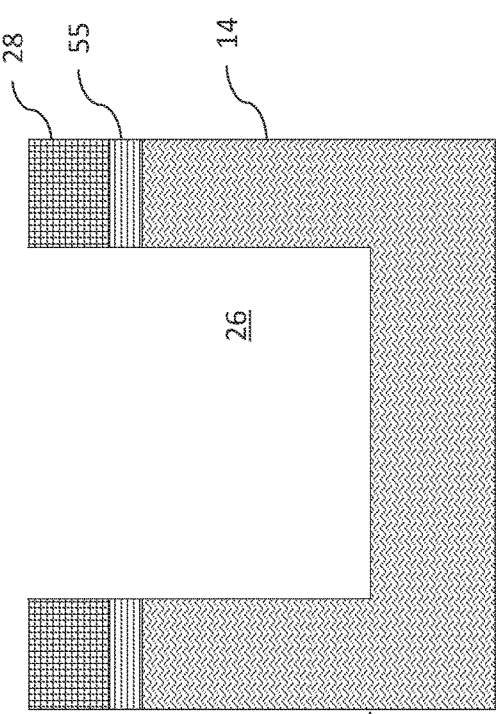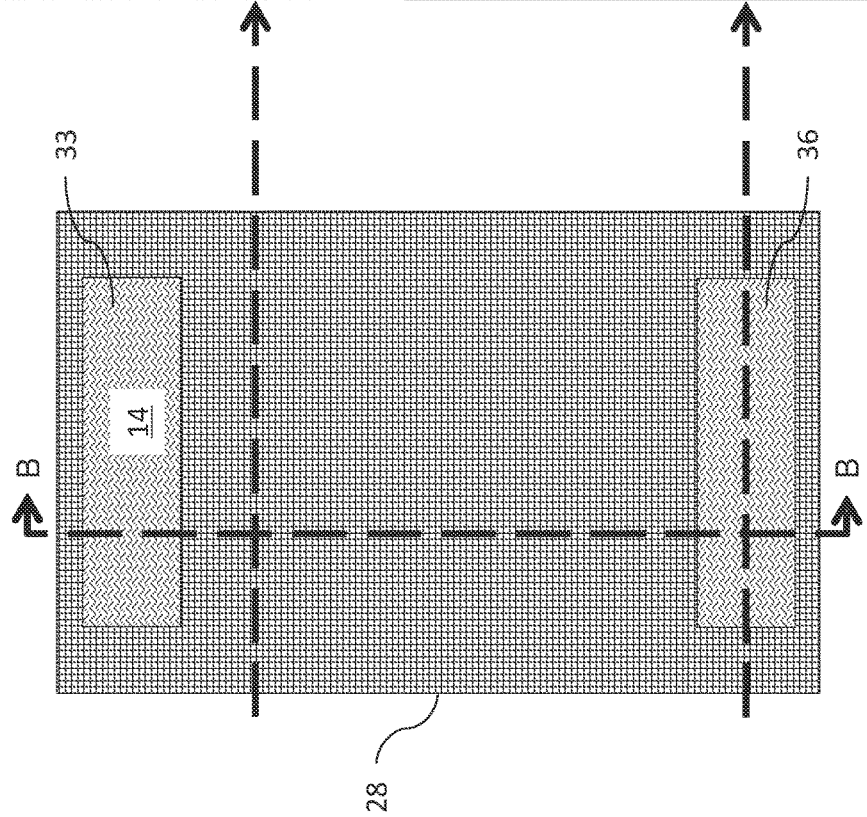

MICROFLUIDIC CHANNEL STRUCTURE AND METHOD

BACKGROUND

Field of the Invention

The present invention relates to semiconductor structures and, more particularly, to embodiments of a semiconductor structure including a microfluidic channel and a method of forming the structure.

Description of Related Art

Various types of biosensors exist. Sensors based on ion-sensitive field effect transistors (FETs) can be integrated into chip manufacturing processes and can be used to detect and measure various aspects of chemical reactions and substance properties. The FET is used for electrical detection of ions in an analyte solution in a channel proximate to the FET. An ion-sensitive FET has a construction that is similar to a metal-oxide-semiconductor FET. The channel can be formed in the chip during fabrication of the FET by wafer bonding and etching. This is an expensive process due to additional wafer processing and bonding. Improved structures for transistor-based sensors and related fabrication methods are needed.

SUMMARY

In view of the foregoing, disclosed herein are embodiments of a structure. The structure can include a substrate and a plurality of layers on the substrate. The structure can further include a first semiconductor layer as at least one of the plurality of layers. The structure can further include a cavity in the first semiconductor layer and a second semiconductor layer over the cavity, such that the sides and bottom of the cavity have the same crystalline structure as the first semiconductor layer and the cover over the cavity has a different crystalline structure. The structure can further include at least one port, which extends through the second semiconductor layer to the cavity.

Further disclosed herein are embodiments of a method of forming a cavity in a semiconductor structure by creating a trench in a first semiconductor layer, filling the trench with a sacrificial material, capping the trench and first semiconductor layer with a second semiconductor layer, forming at least one opening through the second semiconductor layer to the trench, and then removing the sacrificial material from the trench.

According to an exemplary embodiment herein, a structure has a first semiconductor layer having a first surface and a second surface opposite the first surface. The first semiconductor layer is monocrystalline. A cavity extends into the first semiconductor layer at the second surface. A second semiconductor layer is adjacent to the second surface and extends over the cavity. The second semiconductor layer is polycrystalline. At least one opening extends through the second semiconductor layer to the cavity.

According to another exemplary embodiment herein, a structure includes a monocrystalline silicon layer having a first surface and a second surface opposite the first surface. A cavity extends into the monocrystalline silicon layer at the second surface. The structure also includes a polycrystalline silicon layer adjacent to the second surface and extending over the cavity. At least one opening extends through the polycrystalline silicon layer to the cavity.

Also disclosed herein are method embodiments for forming the above-described structures. For example, an embodiment of a method can include forming a microchannel in a monocrystalline silicon layer of a substrate. The monocrystalline silicon layer has a first surface and a second surface opposite the first surface and the microchannel extends into the monocrystalline silicon layer at the second surface. The method further includes filling the microchannel with an oxide. A polycrystalline silicon layer is formed adjacent to the second surface of the monocrystalline silicon layer and extending over the microchannel. At least one opening extending through the polycrystalline silicon layer is formed to the microchannel. The oxide is removed from the microchannel.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 3 is a top view diagram illustrating a partially completed semiconductor structure formed according to the flow diagram of FIG. 2;

FIGS. 3A and 3B are different cross-section diagrams illustrating a partially completed semiconductor structure formed according to the flow diagram of FIG. 2;

FIG. 4 is a top view diagram illustrating a partially completed semiconductor structure formed according to the flow diagram of FIG. 2;

FIGS. 4A and 4B are different cross-section diagrams illustrating a partially completed semiconductor structure formed according to the flow diagram of FIG. 2;

FIG. 6 is a top view diagram illustrating a partially completed semiconductor structure formed according to the flow diagram of FIG. 2;

FIGS. 6A and 6B are different cross-section diagrams illustrating a partially completed semiconductor structure formed according to the flow diagram of FIG. 2;

FIG. 10 is a top view diagram illustrating a partially completed semiconductor structure formed according to the flow diagram of FIG. 8;

FIGS. 10A and 10B are different cross-section diagrams illustrating a partially completed semiconductor structure formed according to the flow diagram of FIG. 8;

FIG. 13 is a top view diagram illustrating a partially completed semiconductor structure formed according to the flow diagram of FIG. 8;

FIGS. 13A and 13B are different cross-section diagrams illustrating a partially completed semiconductor structure formed according to the flow diagram of FIG. 8;

FIG. 14 is a top view diagram illustrating a partially completed semiconductor structure formed according to the flow diagram of FIG. 8; and FIGS. 14A, 14B, and 14C are different cross-section diagrams illustrating a partially completed semiconductor structure formed according to the flow diagram of FIG. 8.

DETAILED DESCRIPTION

Figure 1:
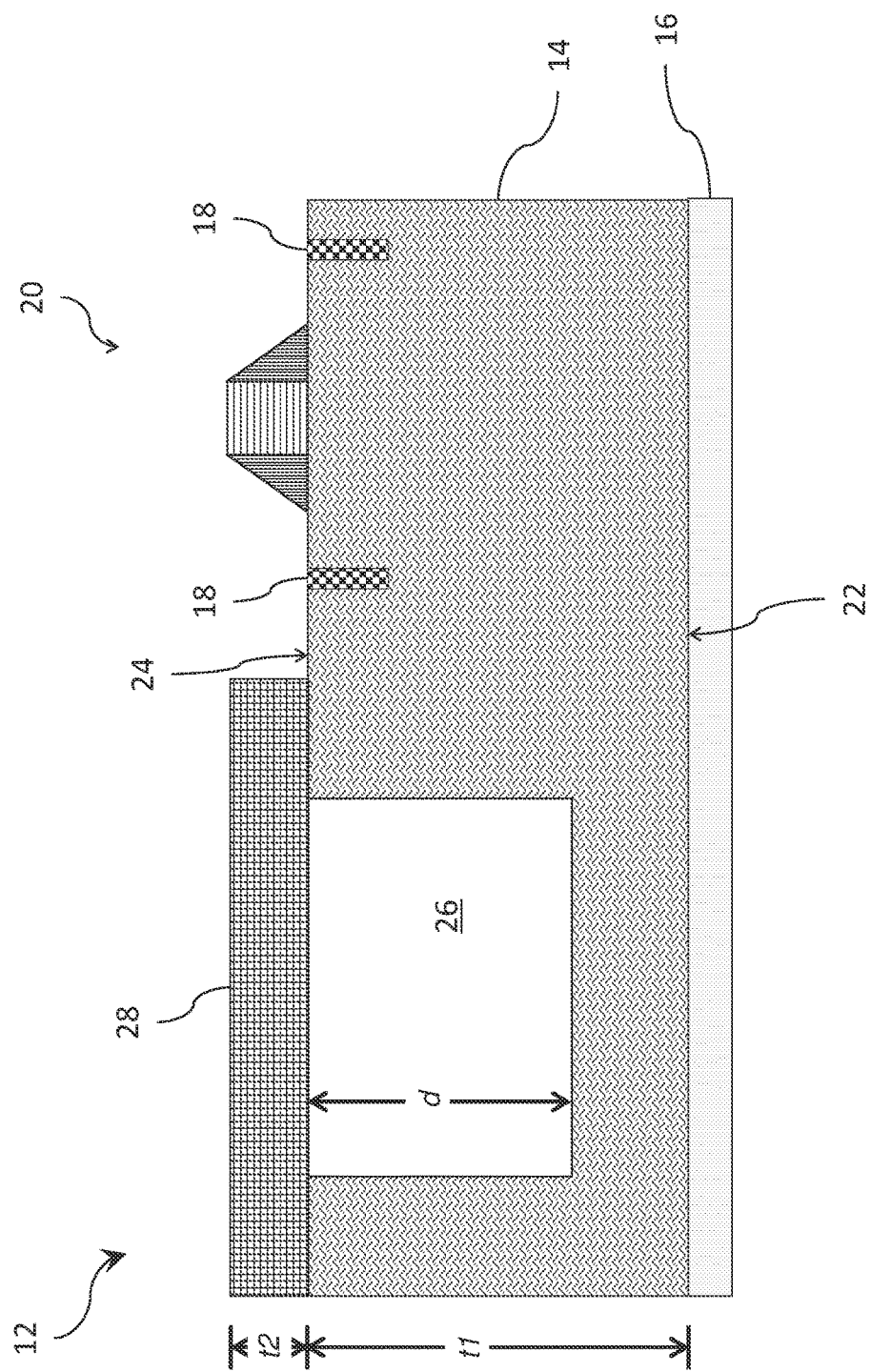
FIG. 1 is a cross-section diagram illustrating a semiconductor structure embodiment including a microchannel adjacent to a field effect transistor (FET)

The present disclosure relates to semiconductor structures and, more particularly, to embodiments of a semiconductor structure including a microfluidic channel and a method of forming the structure. Advantageously, the present disclosure provides methods to form microfluidic channels using compatible processes that are employed in the manufacture of transistors using CMOS (complementary metal-oxide semiconductor) technology.

The disclosure will now be described with reference to structures and methods of forming microfluidic channels in a semiconductor substrate. While the disclosure will be described hereinafter in connection with specific structures and methods thereof, it will be understood that limiting the disclosure to such specific structures and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. The drawings are not to scale; however, in the drawings, like reference numerals have been used throughout to identify identical elements.

It will be readily understood that the structures and methods of the present disclosure, as generally described and illustrated in the drawings herein, may be arranged and designed in a wide variety of different configurations in addition to the structures and methods described herein. Thus, the following detailed description of the structures and methods, as represented in the drawings, is not intended to limit the scope defined by the appended claims but is merely representative of selected structures and methods. The following description is intended only by way of example, and simply illustrates certain concepts of the structures and methods, as disclosed and claimed herein.

In view of the foregoing, disclosed herein are embodiments of a structure. The structure can include a substrate and a plurality of layers on the substrate. The structure can further include a first semiconductor layer as at least one of the plurality of layers. The structure can further include a cavity in the first semiconductor layer and a second semiconductor layer over the cavity, such that the sides and bottom of the cavity have the same crystalline structure as the first semiconductor layer and the cover over the cavity has a different crystalline structure. The structure can further include at least one port, which extends through the second semiconductor layer to the cavity.

Referring now to the drawings, FIG. 1 is a cross-section diagram illustrating disclosed embodiments of a semiconductor structure 12. The semiconductor structure 12 can include a first semiconductor layer 14. In some embodiments, the first semiconductor layer 14 could be a semiconductor layer of a semiconductor-on-insulator structure (e.g., a silicon layer of a silicon-on-insulator (SOI) structure), as illustrated. Alternatively, the first semiconductor layer 14 could be a bulk semiconductor substrate (e.g., a bulk silicon substrate) although other substrate materials are contemplated herein. In some embodiments, the first semiconductor layer 14 can be a monocrystalline semiconductor substrate. An insulator layer 16 can be bonded to the first semiconductor layer 14. In some embodiments, the insulator layer 16 can be $SiO_2$, although other insulator materials are also contemplated herein. The insulator layer 16 can be a buried oxide layer. The first semiconductor layer 14 can be a monocrystalline silicon layer or some other suitable monocrystalline semiconductor layer (e.g., a monocrystalline silicon germanium layer) to form SOI technology based devices.

Isolation regions 18 (e.g., shallow trench isolation (STI) regions) can extend essentially vertically into the first semiconductor layer 14. The isolation regions 18 can further laterally surround and, thereby, define an active device region for a FET 20.

The first semiconductor layer 14 has a first surface 22 proximate the insulator layer 16 and a second surface 24 opposite the first surface 22. A cavity 26 extends into the first semiconductor layer 14 at the second surface 24. A second semiconductor layer 28 is adjacent to the second surface 24 of the first semiconductor layer 14 and extends over the cavity 26. The second semiconductor layer 28 can be a polycrystalline silicon layer. In other words, the sides and bottom of the cavity 26 have a monocrystalline structure from the first semiconductor layer 14 and the cover over the cavity 26 has a polycrystalline structure from the second semiconductor layer 28. The first semiconductor layer 14 can have a thickness t1 of approximately 700 μm and the second semiconductor layer 28 can have a thickness t2 of up to approximately 10 μm. In some embodiments, the cavity 26 can have a depth d of up to approximately 500 μm.

Figure 2:
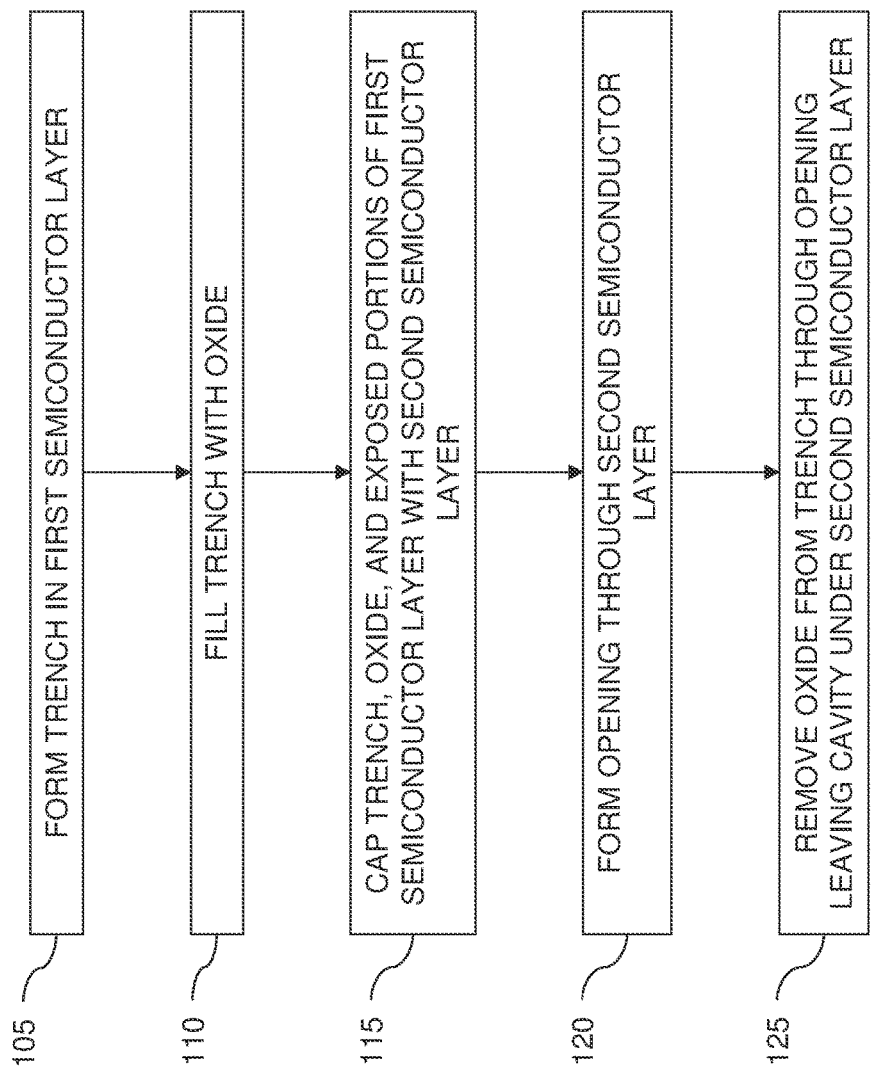
FIG. 2 is a flow diagram illustrating method embodiments for forming the disclosed semiconductor structures.

FIG. 2 is a flow diagram illustrating a method of forming a semiconductor structure 12 according to the present invention.

At 105 of FIG. 2, a trench 30 is formed in the first semiconductor layer 14, as shown in FIG. 3. The trench 30 can be formed by processes using conventional deposition, lithography and etching processes such that no further explanation is required for a complete understanding of the present disclosure. For example, a resist formed over the first semiconductor layer 14 is exposed to energy (light) to form a pattern (opening). An etching process with a selective chemistry, e.g., reactive ion etching (RIE), can be used to form the trench 30 in the first semiconductor layer 14 through the openings of the resist. The resist is then removed by a conventional oxygen ashing process or other known stripants. In some embodiments, the trench 30 can have a length L of approximately xxx μm and a width w of approximately 50 μm. In subsequent processing a channel inlet area 33 and a channel outlet area 36 will be defined in the trench 30. FIG. 3A shows a cross-section of the trench 30 at a middle region of the trench 30. FIG. 3B shows a cross-section of the trench 30 at the channel outlet area 36. The cross-section of the trench at the channel inlet area 33 (not shown) is dimensioned similarly as the channel outlet area 36.

At 110 of FIG. 2, the trench 30 is filled with an oxide 40, as shown in FIG. 4. The oxide can be silicon dioxide ($SiO_2$) or other appropriate oxide, such as hafnium oxide ($HfO_2$), aluminum oxide ($Al_2O_3$), tantalum oxide ($Ta_2O_5$), or zirconium oxide ($ZrO_2$). The deposition of the oxide can be a conventional deposition process, e.g., chemical vapor deposition (CVD) or atomic layer deposition (ALD) to fill the trench 30. The oxide 40 can be deposited within the trench 30, followed by a planarization process, e.g., chemical mechanical planarization (CMP). FIG. 4A shows a cross-section of the trench 30 filled with the oxide 40 at a middle region of the trench 30. FIG. 4B shows a cross-section of the trench 30 filled with the oxide 40 at the channel outlet area 36. The cross-section of the trench at the channel inlet area 33 (not shown) is dimensioned similarly as the channel outlet area 36.

Figure 5A:
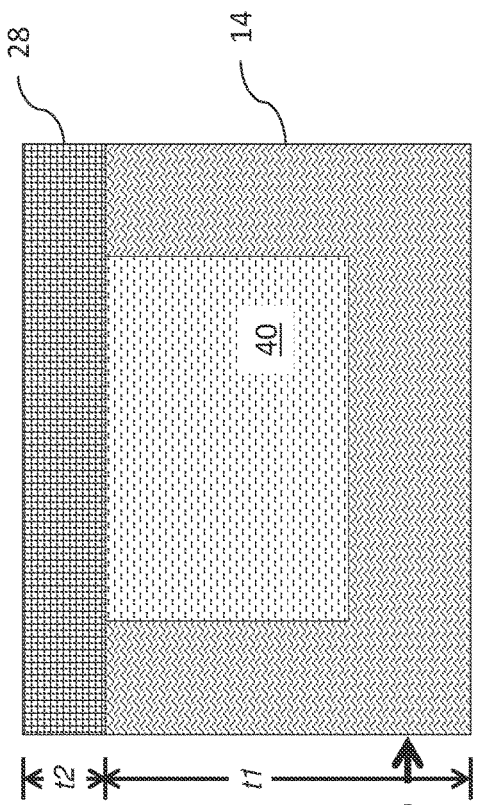
FIGS. 5A and 5B are different cross-section diagrams illustrating a partially completed semiconductor structure formed according to the flow diagram of FIG. 2.
Figure 5B:
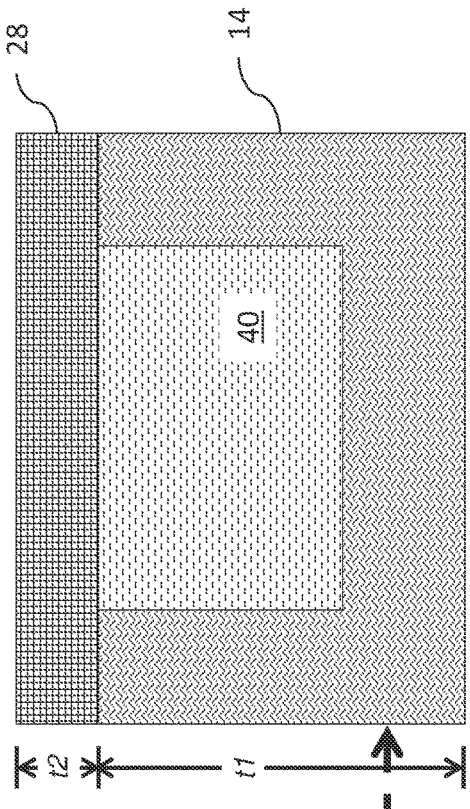
Figure 5:
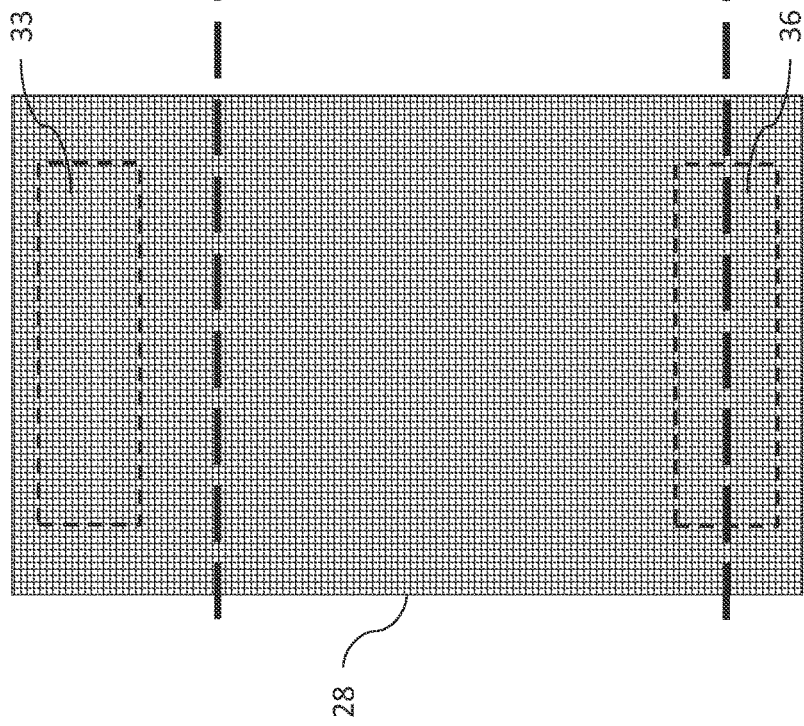
FIG. 5 is a top view diagram illustrating a partially completed semiconductor structure formed according to the flow diagram of FIG. 2.

At 115 of FIG. 2, the oxide 40 in the trench 30 and the exposed portions of the first semiconductor layer 14 are capped with the second semiconductor layer 28, as shown in FIG. 5. The second semiconductor layer 28 is adjacent to the second surface 24 of the first semiconductor layer 14. The second semiconductor layer 28 can be relatively thin (e.g., up to approximately 10 µm or less), which can be deposited by a conventional deposition process, e.g., atomic layer deposition (ALD) process to a thickness of about 10 µm; although other dimensions are contemplated herein depending on the particular technology nodes and/or design parameters. FIG. 5A shows a cross-section of the trench 30 filled with the oxide 40 and capped with the second semiconductor layer 28 at a middle region of the trench 30. FIG. 5B shows a cross-section of the trench 30 filled with the oxide 40 and capped with the second semiconductor layer 28 at the channel outlet area 36. The cross-section of the trench at the channel inlet area 33 (not shown) is dimensioned similarly as the channel outlet area 36.

At 120 of FIG. 2, at least one opening 44, at the channel inlet area 33 and/or channel outlet area 36 is formed through the second semiconductor layer 28, as shown in FIG. 6. The opening 44 can be formed in the second semiconductor layer 28 by processes using conventional deposition, lithography and etching processes such that no further explanation is required for a complete understanding of the present disclosure. FIG. 6A shows a cross-section of the trench 30 filled with the oxide 40 and capped with the second semiconductor layer 28 at a middle region of the trench 30. FIG. 6B shows a cross-section of the trench 30 filled with the oxide 40 and the opening 44 in the second semiconductor layer 28 at the channel outlet area 36. The opening 44 exposes the oxide 40 within the trench 30. The cross-section of the trench at the channel inlet area 33 (not shown) is dimensioned similarly as the channel outlet area 36.

Figure 7A:
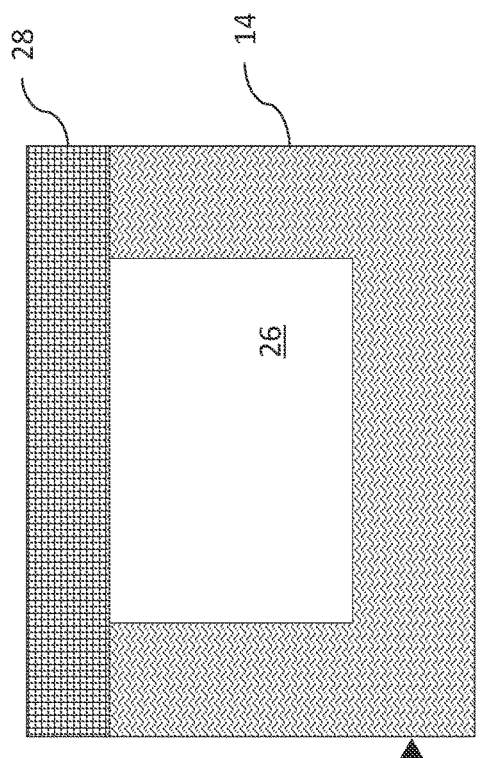
FIGS. 7A, 7B, and 7C are different cross-section diagrams illustrating a partially completed semiconductor structure formed according to the flow diagram of FIG. 2.
Figure 7B:
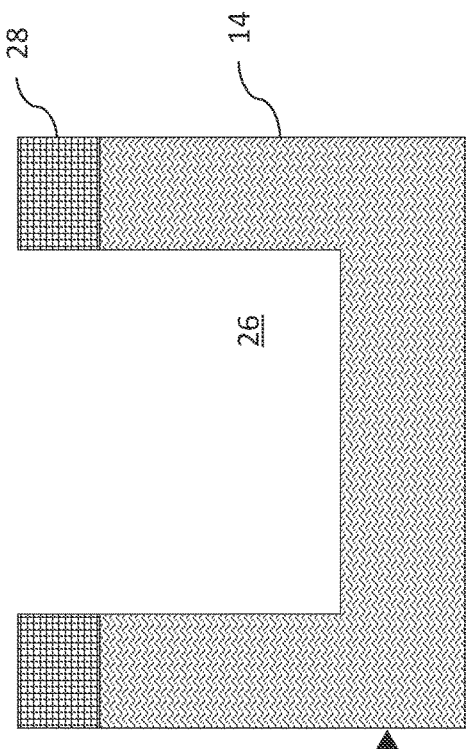
Figure 7:
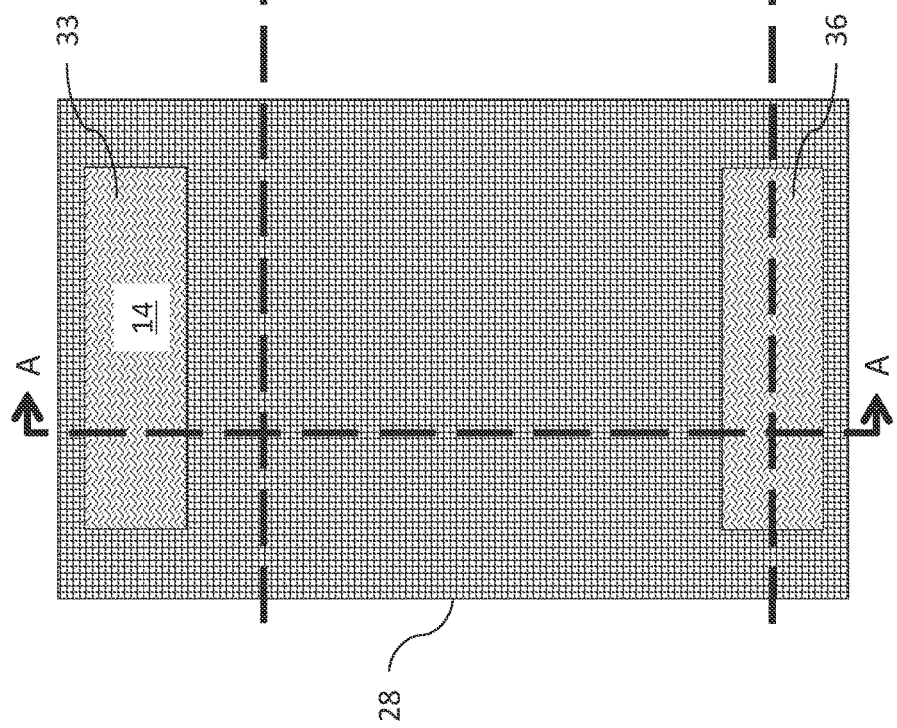
FIG. 7 is a top view diagram illustrating a partially completed semiconductor structure formed according to the flow diagram of FIG. 2.
Figure 7C:
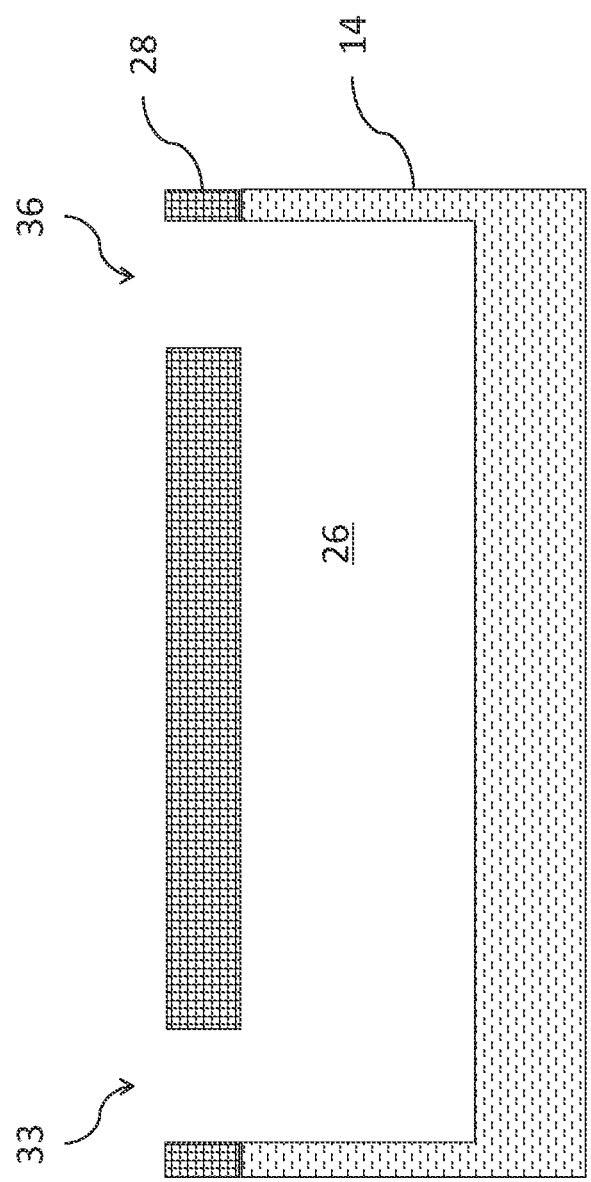

At 125 of FIG. 2, the oxide 40 is removed from the trench 30 through the at least one opening 44 leaving cavity 26 under the second semiconductor layer 28, as shown in FIG. 7. The oxide 40 can be removed by etching or with a cleaning process using conventional methods such as standard RCA clean (SC1/SC2), HF, or SiCoNi. FIG. 7A shows a cross-section of the cavity 26 at a middle region of the trench 30. FIG. 7B shows a cross-section of the cavity 26 at the channel outlet area 36. The cross-section of the trench at the channel inlet area 33 (not shown) is dimensioned similarly as the channel outlet area 36. FIG. 7C shows a lengthwise cross-section of the cavity 26 taken along line A-A of FIG. 7. According to an embodiment, the sides and bottom of the cavity 26 have a monocrystalline structure from the first semiconductor layer 14 and the cap over the cavity 26 has a polycrystalline structure from the second semiconductor layer 28.

In other words, the semiconductor structure 12 can be created by forming microfluidic channels in the monocrystalline first semiconductor layer 14 in a single wafer by creating a trench in the first semiconductor layer 14, filling the trench with an oxide 40, capping the trench with the polycrystalline second semiconductor layer 28, forming at least one opening 44 through the polycrystalline second semiconductor layer 28 down to the oxide 40, and then removing the oxide 40 by processes through the at least one opening 44.

Figure 8:
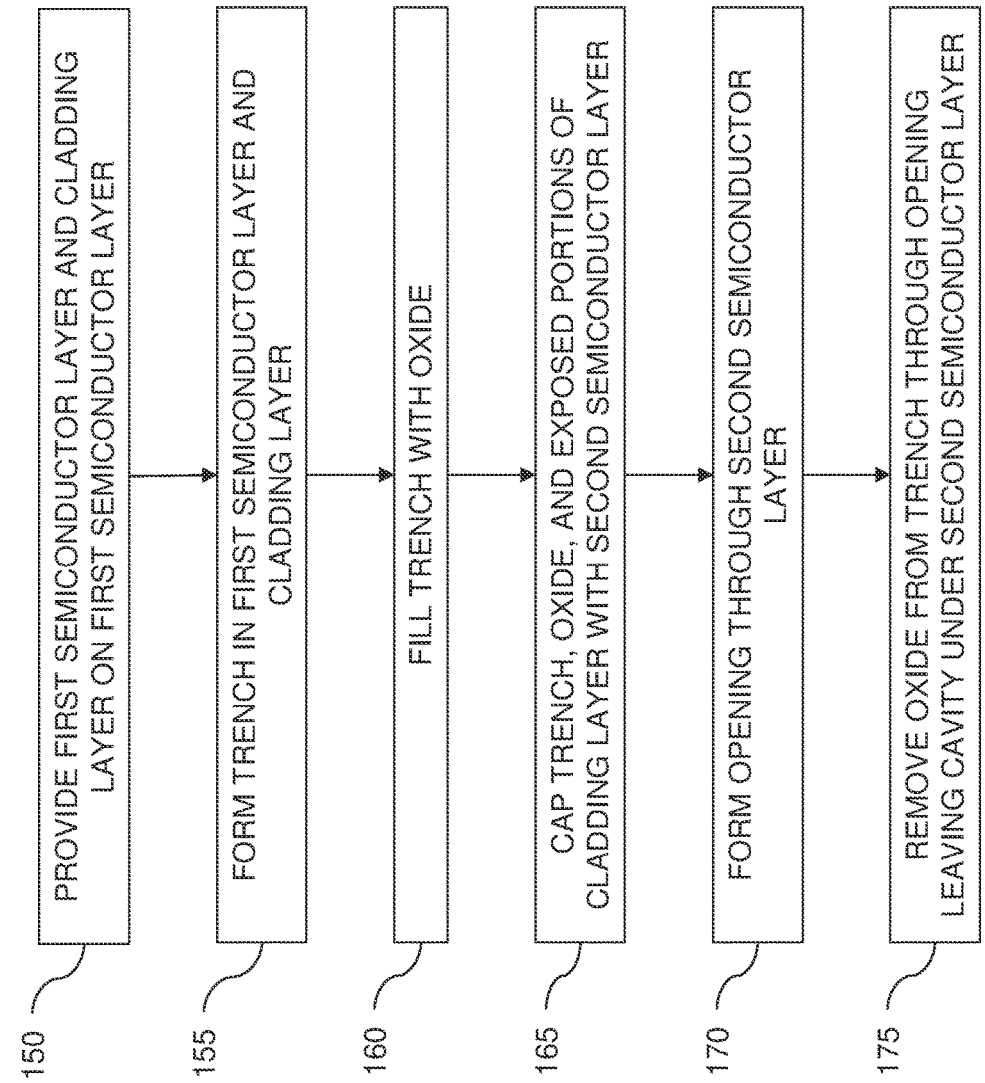
FIG. 8 is a flow diagram illustrating method embodiments for forming the disclosed semiconductor structures.

FIG. 8 is a flow diagram illustrating a method of forming another semiconductor structure 52 according to the present invention.

Figure 9:
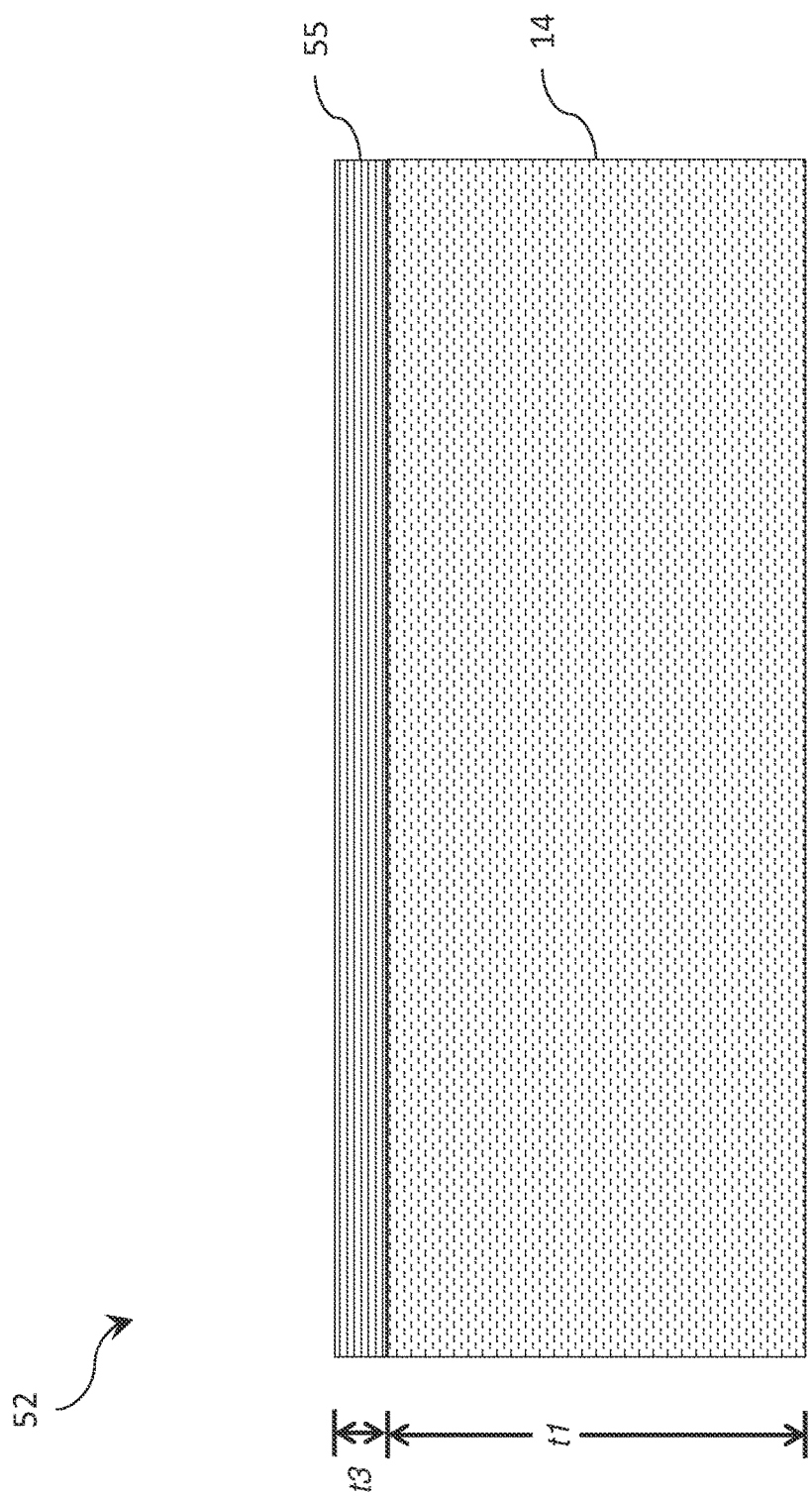
FIG. 9 is a side view diagram illustrating a partially completed semiconductor structure formed according to the flow diagram of FIG. 8.

At 150 of FIG. 8, a first semiconductor layer 14 for the semiconductor structure 52 is provided and a cladding layer 55 is deposited on the first semiconductor layer 14, as shown in FIG. 9. The first semiconductor layer 14 can be a semiconductor layer of a semiconductor-on-insulator structure (e.g., a silicon layer of a silicon-on-insulator (SOI) structure). Alternatively, the first semiconductor layer 14 could be a bulk semiconductor substrate (e.g., a bulk silicon substrate) although other substrate materials are contemplated herein. In some embodiments, the first semiconductor layer 14 can be a monocrystalline semiconductor layer. The cladding layer 55 can be a polycrystalline silicon layer or a dielectric layer, such as SiN, SiBCN, or SiOCN. The cladding layer 55 can be relatively thin (e.g., up to approximately 10 µm or less), which can be deposited by a conventional deposition process, e.g., atomic layer deposition (ALD) process to a thickness of about 10 µm; although other dimensions are contemplated herein depending on the particular technology nodes and/or design parameters. In some embodiments, the first semiconductor layer 14 can have a thickness t1 of approximately 700 µm and the cladding layer 55 can have a thickness t3 of up to approximately 10 µm.

At 155 of FIG. 8, a trench 30 is formed in the first semiconductor layer 14 and the cladding layer 55, as shown in FIG. 10. The trench 30 can be formed by processes using conventional deposition, lithography and etching processes such that no further explanation is required for a complete understanding of the present disclosure. For example, a resist formed over the cladding layer 55 is exposed to energy (light) to form a pattern (opening). An etching process with a selective chemistry, e.g., reactive ion etching (RIE), can be used to form the trench 30 in the cladding layer 55 and the first semiconductor layer 14 through the openings of the resist. The resist is then removed by a conventional oxygen ashing process or other known stripants. In some embodiments, the trench 30 can have a length L of approximately xxx µm, a width w of approximately 50 µm, and a depth d of up to approximately 500 µm. In subsequent processing a channel inlet area 33 and a channel outlet area 36 will be defined in the trench 30. FIG. 10A shows a cross-section of the trench 30 at a middle region of the trench 30. FIG. 10B shows a cross-section of the trench 30 at the channel outlet area 36. The cross-section of the trench at the channel inlet area 33 (not shown) is dimensioned similarly as the channel outlet area 36.

Figure 11A:
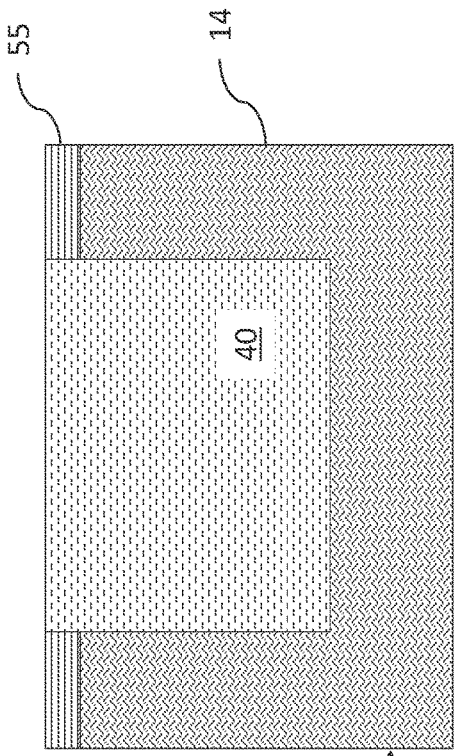
FIGS. 11A and 11B are different cross-section diagrams illustrating a partially completed semiconductor structure formed according to the flow diagram of FIG. 8.
Figure 11B:
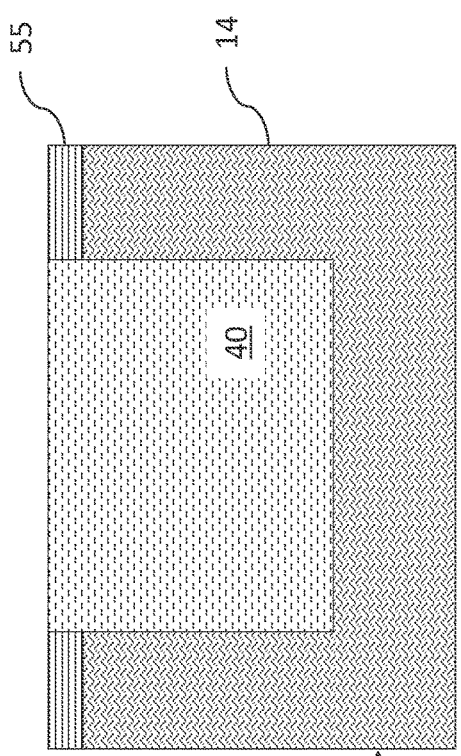
Figure 11:
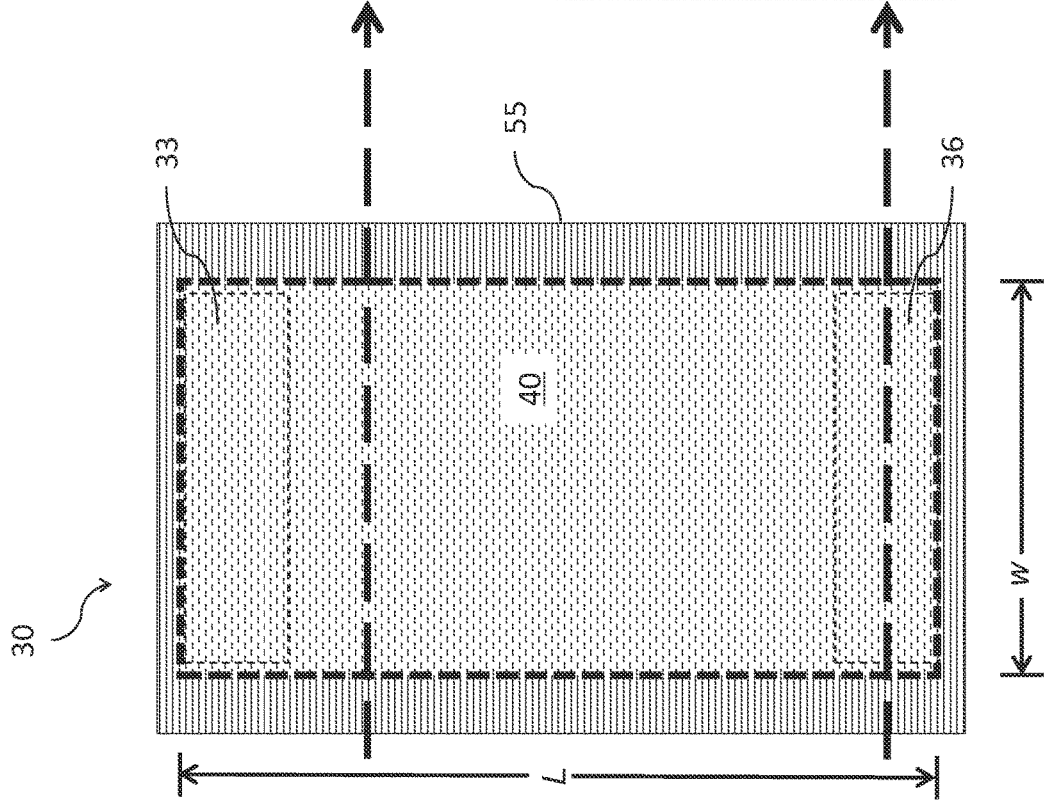
FIG. 11 is a top view diagram illustrating a partially completed semiconductor structure formed according to the flow diagram of FIG. 8.

At 160 of FIG. 8, the trench 30 is filled with an oxide 40, as shown in FIG. 11. The oxide can be silicon dioxide ($SiO_2$)

or other appropriate oxide, such as hafnium oxide ($HfO_2$), aluminum oxide ($Al_2O_3$), tantalum oxide ($Ta_2O_5$), or zirconium oxide ($ZrO_2$). The deposition of the oxide can be a conventional deposition process, e.g., chemical vapor deposition (CVD) or atomic layer deposition (ALD) to fill the trench 30. The oxide 40 can be deposited within the trench 30, followed by a planarization process, e.g., chemical mechanical planarization (CMP). FIG. 11A shows a cross-section of the trench 30 filled with the oxide 40 at a middle region of the trench 30. FIG. 11B shows a cross-section of the trench 30 filled with the oxide 40 at the channel outlet area 36. The cross-section of the trench at the channel inlet area 33 (not shown) is dimensioned similarly as the channel outlet area 36.

Figure 12A:
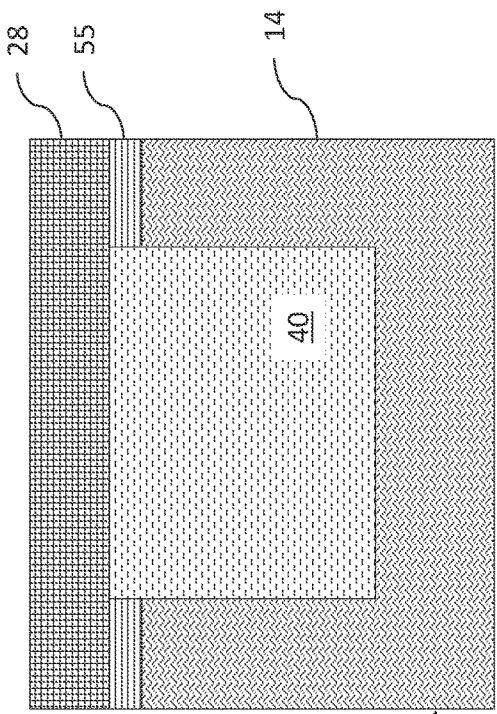
FIGS. 12A and 12B are different cross-section diagrams illustrating a partially completed semiconductor structure formed according to the flow diagram of FIG. 8.
Figure 12B:
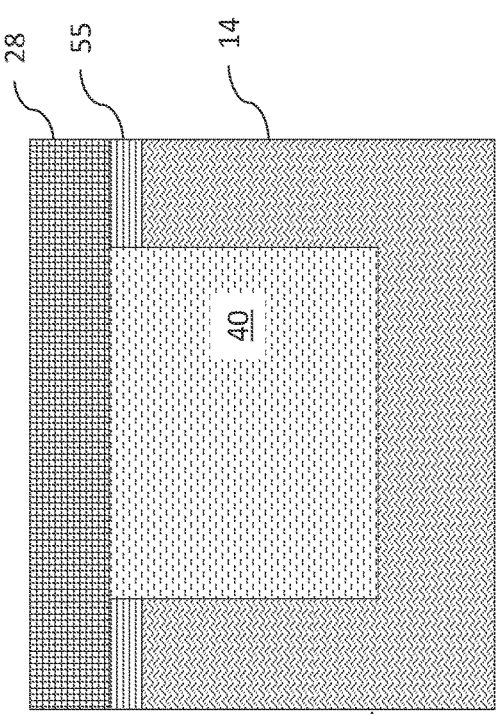
Figure 12:
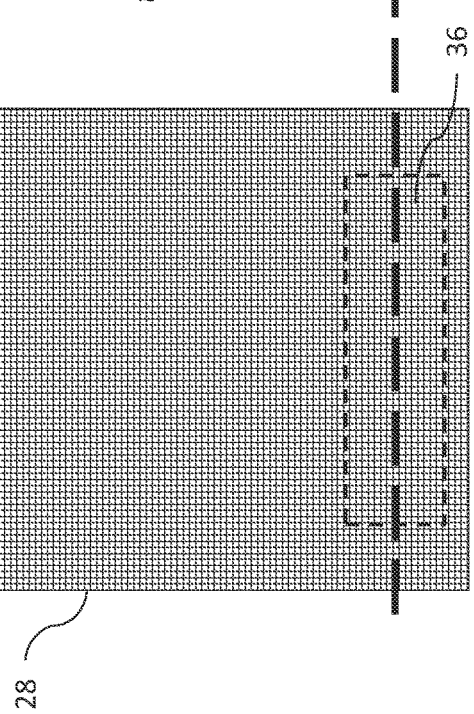
FIG. 12 is a top view diagram illustrating a partially completed semiconductor structure formed according to the flow diagram of FIG. 8.

At 165 of FIG. 8, the oxide 40 in the trench 30 and the exposed portions of the cladding layer 55 are capped with the second semiconductor layer 28, as shown in FIG. 12. The second semiconductor layer 28 can have a thickness t2 that is relatively thin (e.g., up to approximately 10 μm or less), which can be deposited by a conventional deposition process, e.g., atomic layer deposition (ALD) process to a thickness of about 10 μm; although other dimensions are contemplated herein depending on the particular technology nodes and/or design parameters. FIG. 12A shows a cross-section of the trench 30 filled with the oxide 40 and capped with the second semiconductor layer 28 at a middle region of the trench 30. FIG. 12B shows a cross-section of the trench 30 filled with the oxide 40 and capped with the second semiconductor layer 28 at the channel outlet area 36. The cross-section of the trench at the channel inlet area 33 (not shown) is dimensioned similarly as the channel outlet area 36.

At 170 of FIG. 8, at least one opening 44, at the channel inlet area 33 and/or channel outlet area 36 is formed through the second semiconductor layer 28, as shown in FIG. 13. The opening 44 can be formed in the second semiconductor layer 28 by processes using conventional deposition, lithography and etching processes such that no further explanation is required for a complete understanding of the present disclosure. FIG. 13A shows a cross-section of the trench 30 filled with the oxide 40 and capped with the second semiconductor layer 28 at a middle region of the trench 30. FIG. 13B shows a cross-section of the trench 30 filled with the oxide 40 and the opening 44 in the second semiconductor layer 28 at the channel outlet area 36. The opening 44 exposes the oxide 40 within the trench 30. The cross-section of the trench at the channel inlet area 33 (not shown) is dimensioned similarly as the channel outlet area 36.

Figure 14C:
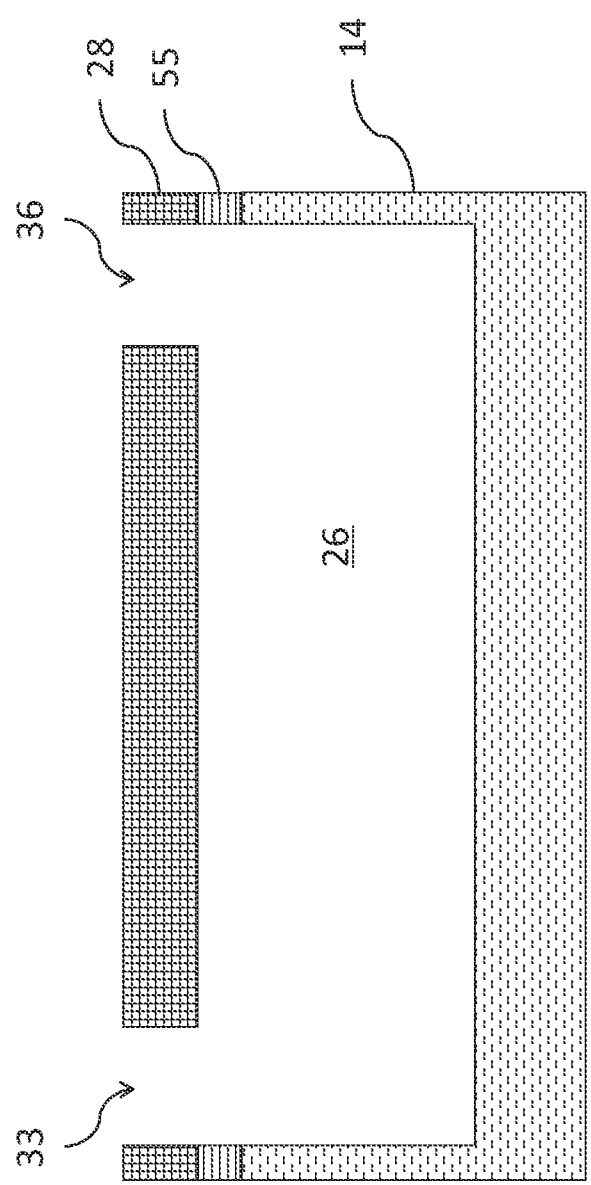

At 175 of FIG. 8, the oxide 40 is removed from the trench 30 through the at least one opening 44 leaving cavity 26 under the second semiconductor layer 28, as shown in FIG. 14. The oxide 40 can be removed by etching or with a cleaning process using conventional methods such as standard RCA clean (SC1/SC2), HF, or SiCoNi. FIG. 14A shows a cross-section of the cavity 26 at a middle region of the trench 30. FIG. 14B shows a cross-section of the cavity 26 at the channel outlet area 36. The cross-section of the trench at the channel inlet area 33 (not shown) is dimensioned similarly as the channel outlet area 36. FIG. 14C shows a lengthwise cross-section of the cavity 26 taken along line B-B of FIG. 14. When the cladding layer 55 is a polycrystalline silicon layer, the cavity 26 has side surfaces comprising a lower monocorystalline semiconductor portion and an upper polycrystalline semiconductor portion above the lower monocrystalline semiconductor portion. When the cladding layer 55 is a dielectric layer, the cavity 26 has side surfaces comprising a lower monocrystalline semiconductor portion and an upper dielectric portion above the lower monocrystalline semiconductor portion.

The semiconductor structure 12, 52 can further include additional dielectric layers extending laterally over the second semiconductor layer 28. Such additional dielectric layers can be, for example, a relatively thin silicon nitride layer or a relative thin layer of some other dielectric material suitable for use as an etch stop layer. The semiconductor structure 12, 52 can further include at least one MOL ILD material layer on the etch stop layer. The ILD material layer can be, for example, silicon dioxide, doped silicon glass (e.g., phosphosilicate glass (PSG) or borophosphosilicate glass (BPSG)), or any other suitable ILD material. This ILD material layer can cap the opening(s) 44, as necessary. Furthermore, although not shown, some of the ILD material may be deposited into the opening(s) 44 onto the surface at the bottom of the cavity 26.

The semiconductor structure 12, 52 can further include one or more back end of the line (BEOL) metal levels on the top surface of the ILD material layer. For example, a BEOL metal level can include a relatively thin dielectric layer such as an additional etch stop layer (e.g., a thin silicon nitride layer) above and immediately adjacent to the top surface of the ILD material layer, an additional ILD material layer on the additional etch stop layer, and yet another additional etch stop layer on the additional ILD material layer. The semiconductor structure 12, 52 can further include one or more metal wires in the BEOL metal level(s) (e.g., within the various layers).

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

Finally, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a first semiconductor layer having a first surface and a second surface opposite the first surface, wherein the first semiconductor layer is monocrystalline and wherein a cavity extends into the first semiconductor layer at the second surface; and
    a second semiconductor layer adjacent to the first semiconductor layer, entirely above the second surface, and extending over the cavity, wherein the second semiconductor layer is polycrystalline and wherein at least one opening extends through the second semiconductor layer to the cavity; and
    a transistor on the first semiconductor layer and positioned laterally adjacent the cavity, wherein an end of the second semiconductor layer is above the second surface and between the cavity and the transistor; and the transistor comprises an active device region in the first semiconductor layer.

2. The structure of claim 1, wherein the second semiconductor layer contacts the second surface only of the first semiconductor layer.

3. The structure of claim 1, wherein the cavity has a monocrystalline semiconductor bottom surface and a polycrystalline semiconductor top surface.

4. The structure of claim 1, wherein the cavity has monocrystalline semiconductor side surfaces.

5. The structure of claim 1, wherein the second semiconductor layer has a first portion immediately adjacent to the second surface and a second portion extending over the cavity and wherein the first portion and the second portion are at different levels relative to the first surface.

6. The structure of claim 5, wherein the cavity has side surfaces comprising a lower monocorystalline semiconductor portion and an upper polycrystalline semiconductor portion above the lower monocrystalline semiconductor portion.

7. The structure of claim 1, further comprising a dielectric layer on the second surface between the first semiconductor layer and the second semiconductor layer, wherein the cavity further extends through the dielectric layer.

8. The structure of claim 7, wherein the cavity has side surfaces comprising a lower monocorystalline semiconductor portion and an upper dielectric portion above the lower monocrystalline semiconductor portion.

9. A structure comprising:
    a monocrystalline silicon layer having a first surface and a second surface opposite the first surface, wherein a cavity extends into the monocrystalline silicon layer at the second surface; and
    a polycrystalline silicon layer adjacent to the monocrystalline silicon layer, entirely above the second surface and extending over the cavity, wherein at least one opening extends through the polycrystalline silicon layer to the cavity;
    a transistor on the monocrystalline silicon layer and laterally adjacent the cavity; and an isolation region in the monocrystalline silicon layer and between the transistor and the cavity, wherein an end of the polycrystalline silicon layer is above the second surface and between the cavity and the isolation region; and the transistor comprises an active device region in the first semiconductor layer.

10. The structure of claim 9, wherein the polycrystalline silicon layer contacts the second surface only of the monocrystalline silicon layer.

11. The structure of claim 9, wherein the polycrystalline silicon layer has a first portion immediately adjacent to the second surface and a second portion extending over the cavity and wherein the first portion and the second portion are at different levels relative to the first surface.

12. The structure of claim 11, wherein the cavity has side surfaces comprising a lower monocorystalline silicon portion and an upper polycrystalline silicon portion above the lower monocrystalline silicon portion.

13. The structure of claim 9, further comprising a dielectric layer on the second surface between the monocrystalline silicon layer and the polycrystalline silicon layer, wherein the cavity further extends through the dielectric layer.

14. The structure of claim 13, wherein the cavity has side surfaces comprising a lower monocorystalline silicon portion and an upper dielectric portion above the lower monocrystalline silicon portion.

15. A method comprising:
    forming a cavity in a monocrystalline silicon layer having a first surface and a second surface opposite the first surface, wherein the cavity extends into the monocrystalline silicon layer at the second surface;
    forming a polycrystalline silicon layer adjacent to the monocrystalline silicon layer, entirely above the second surface, and extending over the cavity; and
    forming an opening through the polycrystalline silicon layer to the cavity; and
    forming a transistor on the monocrystalline silicon layer and positioned laterally adjacent to the cavity, wherein an end of the polycrystalline silicon layer is above the second surface and between the cavity and the transistor; and the transistor comprises an active device region in the first semiconductor layer.

16. The method of claim 15, further comprising:
    filling the cavity with an oxide, wherein the polycrystalline silicon layer is formed so that it extends over and is immediately adjacent to the oxide.

17. The method of claim 16, further comprising removing the oxide using processes through the opening in the polycrystalline silicon layer.

18. The method of claim 15, wherein the polycrystalline silicon layer contacts the second surface only of the monocrystalline silicon layer.

19. The method of claim 15, further comprising forming a dielectric layer on the second surface between the monocrystalline silicon layer and the polycrystalline silicon layer, wherein the cavity further extends through the dielectric layer.

20. The method of claim 15, wherein the cavity has a monocrystalline silicon bottom surface and a polycrystalline silicon top surface.

\* \* \* \* \*